US008077664B2

(12) United States Patent
Zangi

(10) Patent No.: US 8,077,664 B2
(45) Date of Patent: Dec. 13, 2011

(54) PRECODING WITH REDUCED FEEDBACK FOR COORDINATED MULTIPOINT TRANSMISSION ON THE DOWNLINK

(75) Inventor: Kambiz Zangi, Chapel Hill, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 288 days.

(21) Appl. No.: 12/566,063

(22) Filed: Sep. 24, 2009

(65) Prior Publication Data

US 2010/0150267 A1    Jun. 17, 2010

Related U.S. Application Data

(60) Provisional application No. 61/121,775, filed on Dec. 11, 2008.

(51) Int. Cl.
*H04W 4/00* (2009.01)

(52) U.S. Cl. ......... 370/328; 370/252; 370/329; 375/260

(58) Field of Classification Search .................. 370/203, 370/206, 208, 241, 252, 281, 329, 331, 330, 370/328, 310, 480; 375/260, 267, 269, 296; 455/450, 418, 101, 452.1, 422.1
See application file for complete search history.

(56) References Cited

U.S. PATENT DOCUMENTS

| | | | |
|---|---|---|---|
| 2007/0191066 A1* | 8/2007 | Khojastepour et al. | 455/562.1 |
| 2009/0257356 A1* | 10/2009 | Frederiksen et al. | 370/252 |
| 2010/0027456 A1* | 2/2010 | Onggosanusi et al. | 370/312 |
| 2010/0098012 A1* | 4/2010 | Bala et al. | 370/329 |
| 2010/0104033 A1* | 4/2010 | Gorokhov | 375/260 |
| 2010/0118989 A1* | 5/2010 | Sayana et al. | 375/260 |
| 2010/0118997 A1* | 5/2010 | Lee et al. | 375/260 |
| 2010/0166097 A1* | 7/2010 | Zhou et al. | 375/267 |
| 2010/0172340 A1* | 7/2010 | Muharemovic et al. | 370/350 |
| 2011/0086654 A1* | 4/2011 | Larsson | 455/501 |

FOREIGN PATENT DOCUMENTS

| | | |
|---|---|---|
| EP | 1 914 947 A1 | 4/2008 |
| WO | WO 2008/065462 A2 | 6/2008 |

* cited by examiner

*Primary Examiner* — Aung S Moe
*Assistant Examiner* — Abdullah Riyami

(57) ABSTRACT

Techniques for reducing the number of bits needed to specify the best precoding vector for each mobile station in a wireless communication network that employs multi-point transmission are disclosed. An exemplary method begins with the estimation of path loss between a mobile station and each of a plurality of geographically separated transmitter sites, each transmitter site having at least one transmitter antenna. Based on the estimated path losses, one of a plurality of pre-determined subsets (codebooks) of a pre-determined set of antenna precoding vectors is selected. A group index identifying the selected subset is then transmitted to the mobile station. Subsequently, a vector index is received from the mobile station, the vector index corresponding to a precoding vector in the selected subset, and data is transmitted to the mobile station, using the precoding vector applied to the transmitter antennas at the plurality of transmitter sites.

17 Claims, 5 Drawing Sheets

PRECODING WITH REDUCED FEEDBACK FOR COORDINATED MULTIPOINT TRANSMISSION ON THE DOWNLINK

RELATED APPLICATION

This application claims priority under 35 U.S.C. §119(e) to U.S. Provisional Patent Application Ser. No. 61/121,775, filed 11 Dec. 2008 by Kambiz Zangi, the entire contents of which are incorporated herein by reference.

TECHNICAL FIELD

The present invention relates generally to wireless communications systems, and more particularly relates to methods and apparatus for determining transmission parameters in a mobile communications network using coordinated transmissions from multiple transmitter sites.

BACKGROUND

Precoding of multi-antenna transmissions is an increasingly popular technique used in several advanced wireless communications standards. Precoding techniques include single-layer beamforming, where the same signal is emitted from each of several transmit antennas, but with different precoding weights applied to each of the antennas so that the signal power is maximized at the receiver output. When the receiver has multiple antennas, precoding is used for multi-layer beamforming in order to maximize the throughput performance of a multiple receive antenna system. With multi-layer precoding, multiple data streams are simultaneously transmitted, with independent weights applied to each antenna to maximize the link capacity or quality.

The Wideband Code-Division Multiple Access (W-CDMA) and Long-Term Evolution (LTE) standards promulgated by the 3rd-Generation Partnership Project (3GPP) each permit linear precoding on the downlink, when multiple transmit antennas are used to serve a mobile station (User Equipment, or "UE", in 3GPP parlance). The transmitter antenna precoding vector that maximizes the data rate received by each mobile depends on the instantaneous downlink channel (including fading) to the mobile; hence, implementing this optimal precoder requires the network to acquire channel state information characterizing the propagation conditions between each of the transmit antennas and the mobile station. In an Orthogonal Frequency-Division Multiple Access (OFDMA) system like LTE, this channel state information must be acquired for each pair of receive/transmit antennas (i.e., M×N single-input/single-output channels, where M is the number of transmit antennas and N is the number of receive antennas).

Codebook-based linear precoding is a technique that reduces the amount of information needed to feedback from the mobile to the network for implementing the linear precoding. With a traditional codebook-based precoding, a fixed set of allowed precoder weighting vectors (a codebook) is chosen a priori, and each precoding vector in this set is assigned a unique index that is known to both the network and the mobile stations. Each mobile station measures its downlink channel (of size M×N) and determines the "best" precoding vector belonging to the codebook, given the downlink channel measurements. The mobile station feeds back an index of this best precoding vector to the network, so that subsequent transmissions from the network can be precoded according to the selected vector.

Assuming a codebook consisting of L precoding vectors, $\log_2(L)$ bits are needed to uniquely identify a single precoding vector. Typically, $\log_2(L)$ bits is fewer than the number of bits needed to characterize the M×N downlink channel each mobile station sees; thus, the codebook-based approach reduces the amount of signaling information that must be transmitted between the mobile station and the network.

In WCDMA and LTE systems, a multi-antenna transmission to a mobile station is generally transmitted from only a single point, i.e., a single transmitter site. In other words, the M transmit antennas used to serve a given mobile are usually co-located. In this case, the channel between every one of these antennas and the mobile station has the same path loss and shadowing. The codebooks in LTE and WCDMA are designed specifically for the case when all the transmit antennas are co-located, i.e., for the case in which the path loss between each of the transmitter antennas and the mobile station is the same, or very close to the same. (The term "path loss" is sometimes used to refer only to the propagation loss caused by distance between the transmitter and receiver, whether a free-space model, i.e., where path loss is proportional to the distance squared, or an empirically derived model, e.g., where path loss is proportional to the distance raised to the fourth power, is used. "Shadowing," on the other hand, generally refers to losses caused by particular features of the environment in a given scenario, such as losses caused by the proximity of a large building or geological feature. In the remainder of this disclosure, however, the term "path loss" is generally intended to include both of these phenomena, unless the context indicates otherwise, but to exclude the distinct phenomena of fading, which results from the destructive combining of multipath components of the transmitted signal at the receiver.)

In developing the specifications for the so-called LTE-Advanced system, 3GPP members are considering the use of true multi-point transmission (i.e., from multiple transmitter sites), where the M transmit antennas used to serve a given mobile station could be located at several different geographical locations. In these scenarios, the channels between the mobile station and various ones of these antennas could have different path losses. Conventional codebook-based techniques for specifying a particular precoding vector to be used, given rapidly varying channel conditions, are poorly suited for the multi-point transmission scenario.

SUMMARY

With multi-point transmission, mobile stations are subject to different combinations of path losses between the mobile stations and each of the several transmitter sites, depending on the mobile stations' locations. Hence, the total number of possible codebook entries needed to implement codebook-based precoding can become quite large with multipoint transmission. Conventional approaches in which a single precoding vector is identified, from all possible precoding vectors, would require a large number of bits, and thus a large signaling load between the mobile station and the network. This large signaling load consumes system resources that could otherwise be used for transmission of data to the users in the system.

Embodiments of the present invention include techniques for reducing the number of bits needed to specify the best precoding vector for each mobile station in a wireless communication network that employs multi-point transmission. Because the path losses (including shadowing effects) between a given mobile station and the M transmit antennas vary at a much slower rate than the fading due to multipath effects, the optimal choice of a codebook adapted to a particular combination of path losses changes at a rate much slower than fading. Thus, various embodiments of the invention involve specifying any one precoding vector as a two step process. First, a codebook in which a particular desired precoding vector resides is specified. This specification can be done with $\log_2(Q)$ bits, given Q possible codebooks. Each codebook conceptually corresponds to a particular combination of path losses between a mobile station and the M transmit antennas to be used for multi-point transmission to the mobile station. Second, an index to the particular desired precoding vector within the earlier identified codebook is specified. This specification can be done with $\log_2(L)$ bits, given that each codebook includes no more than L precoding vectors.

At a slow rate (e.g., once every few seconds, or even less frequently), each mobile station can update its choice of codebook, given the recent path loss conditions. Once data transmission to a mobile station is begun, the mobile station repeatedly identifies the best precoding vector in the selected codebook, based on current fading conditions. Thus, the particular precoding vector used for a given transmission is updated more frequently than the codebook from which the precoding vectors are selected. As long as any updates to the codebook are much less frequent than the updates to the particular precoding vector used, the overall amount of feedback bits required to specify the best precoder with multi-point transmission is very similar to the amount of feedback bits needed with single-point transmission with a single codebook of size L.

Accordingly, one exemplary method for determining transmission parameters in a mobile communications network using coordinated transmissions from multiple transmitter sites begins with the estimation of path loss between a mobile station and each of a plurality of geographically separated transmitter sites, each transmitter site having at least one transmitter antenna. Based on the estimated path losses, one of a plurality of pre-determined subsets (codebooks) of a pre-determined set of antenna precoding vectors is selected. A group index is then transmitted to the mobile station, the group index identifying the selected subset of antenna precoding vectors.

Subsequently, a first vector index is received from the mobile station, the first vector index corresponding to a first antenna precoding vector in the selected subset, and first data is transmitted to the mobile station, using the first antenna precoding vector applied to the transmitter antennas at the plurality of transmitter sites.

In some embodiments of the above-summarized method, estimating path loss between a mobile station and each of the plurality of geographically separated transmitter sites comprises receiving channel state reports from the mobile station and estimating the path losses based on the channel state reports, wherein the channel state reports characterize downlink path loss, received downlink signal quality, or both. In other embodiments, estimating path loss between a mobile station and each of the plurality of geographically separated transmitter sites may instead comprise estimating uplink path losses, based on measurements of uplink signals from the mobile station, and then estimating corresponding downlink path losses based on the estimated uplink path losses.

In some embodiments, site information is transmitted to the mobile station prior to receiving the first vector index from the mobile station, the site information identifying the plurality of geographically separated transmitter sites to the mobile station.

As suggested above, the "best" precoding vector within a selected codebook may change over time, due to changing fading conditions. Thus, in some embodiments, any of the methods discussed above may further comprise receiving a second vector index from the mobile station, the second vector index corresponding to a second antenna precoding vector in the selected subset, and transmitting second data to the mobile station, using the second antenna precoding vector applied to the transmitter antennas at the plurality of geographically separated transmitter sites.

The above-summarized methods may, in some embodiments, be suitable for implementation in or at one or more fixed nodes of a wireless communication system using coordinated transmissions from multiple transmitter sites. Thus, various arrangements of processing circuits in one or more fixed nodes of such a mobile communications network are disclosed herein, these arrangements generally corresponding to the methods summarized above.

Other exemplary methods might be more suitable for implementation in a mobile station operating in a mobile communications network using coordinated transmissions from multiple transmitter sites. In some such methods, transmitter site information identifying a plurality of geographically separated transmitter sites is received, and a group index identifying a selected one of a plurality of pre-determined subsets of a pre-determined set of antenna precoding vectors is determined. In some embodiments, the group index is determined by simply receiving the group index from the mobile communications network; in others, determining the group index comprises estimating path loss between the mobile station and each of the plurality of geographically separated transmitter sites, selecting one of a plurality of pre-determined subsets of a pre-determined set of antenna precoding vectors, based on the estimated path losses, and identifying the group index corresponding to the selected subset. In these latter embodiments, the group index may be transmitted to the mobile communications network.

In either case, channel conditions between the transmitter antennas and the mobile station are evaluated, and a first antenna precoding vector from the selected subset is selected, based on the channel conditions. A first vector index is transmitted to the mobile communications network, the first vector index identifying the first antenna precoding vector, given the selected subset. Subsequent transmissions from the network, using the identified precoding vector may be processed at the mobile station using the first antenna precoding vector, in some embodiments.

Again, the "best" precoding vector within a given codebook may change, as fading conditions change. Thus, several methods according to the present invention comprise re-evaluating channel conditions between the transmitter antennas and the mobile station, selecting a second antenna precoding vector from the selected subset, based on the re-evaluated channel conditions, and transmitting a second vector index to the mobile communications network, the second vector index identifying the second antenna precoding vector, given the selected subset.

A mobile station containing processing circuits configured to carry out one or more of the mobile station-related methods summarized above is also described herein. Of course, the present invention may be carried out in other ways than those specifically set forth herein without departing from essential characteristics of the invention. Indeed, upon reading the following description and viewing the attached drawings, the skilled practitioner will recognize that the described embodiments are illustrative and not restrictive, and that all changes coming within the meaning and equivalency range of the appended claims are intended to be embraced therein.

DETAILED DESCRIPTION

With multi-point transmission, the best codebook (set of precoding vectors) for a given mobile station depends on the M-tuple of path-loss/shadowing between each of the M possible transmit antennas and the mobile station. If it is assumed that Q distinct combinations of path-loss between a mobile station and the M possible transmit antennas are considered, the most straight-forward way of specifying the best precoder for each sub-carrier would require $\log_2(Q*L)=\log_2(Q)+\log_2(L)$ bits, assuming that each of Q codebooks includes L precoding vectors. Since there are many possible combination of path loss combinations corresponding to the possible combinations of transmitter sites and mobile station positions in a given network, Q could be quite large in a typical cellular system. As a result, the amount of feedback for implementing codebook-based precoding in a multi-point transmission system could be much larger than the amount of feedback required in a single-point system.

If it is assumed that each mobile station can be served by up to S transmitter sites, and that each site contains P transmit antenna ports, then the maximum number of antennas serving each mobile station will be M=P*S. Of course, the number of transmitter sites actually used at a given time may vary, depending on network configuration, the position of the mobile station within the network, and various other factors such as throughput demands from the mobile station, loading of the network, and so on.

Figure 1:
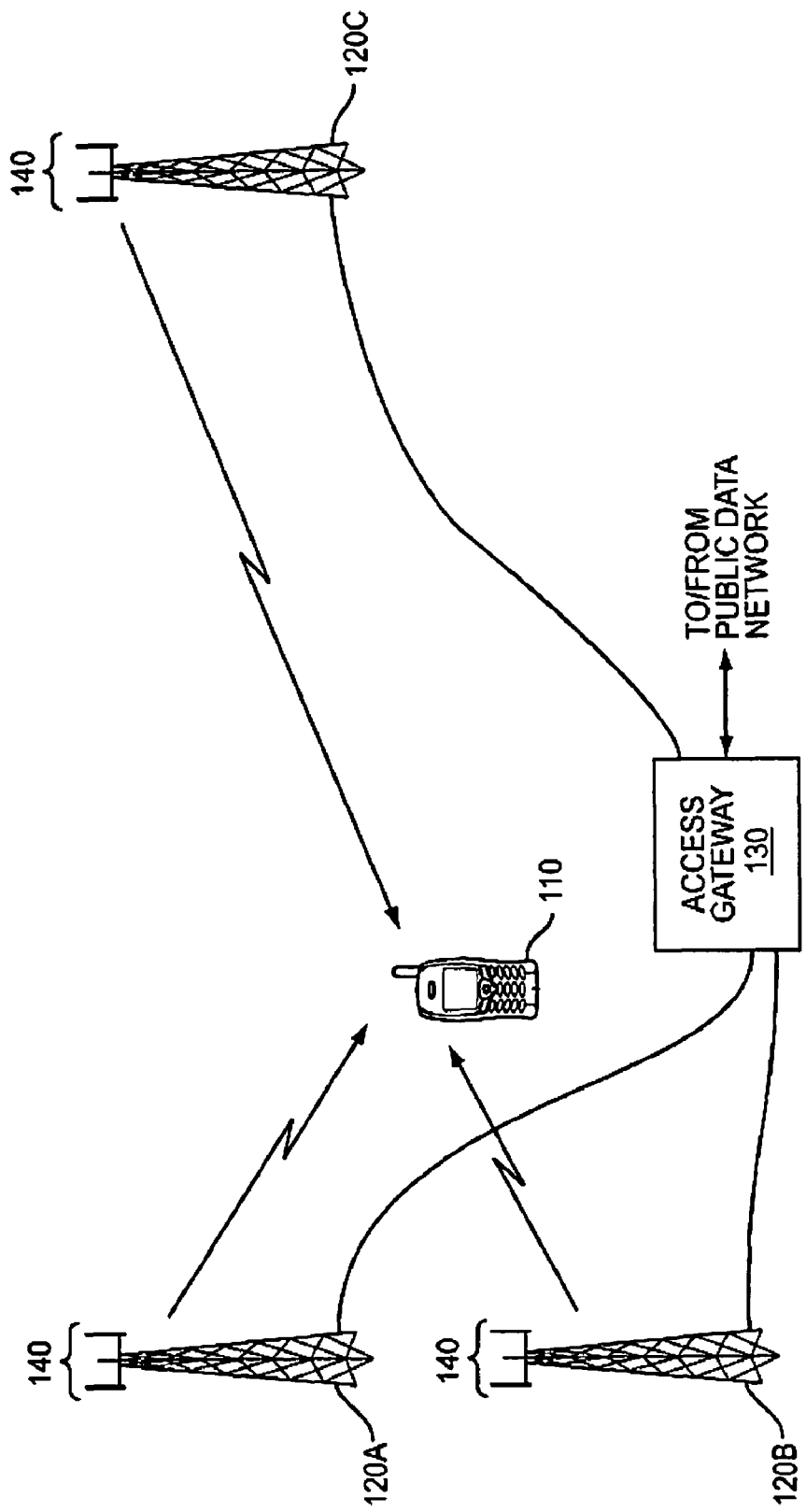
FIG. 1 illustrates an exemplary wireless communication network employing multi-point transmission.

FIG. 1 illustrates an example of a multi-point network scenario in which mobile station 110 is receiving coordinated multi-point transmissions from three base stations 120, which are tied to a public data network (not shown) via access gateway 130. Each of the base stations 120 is transmitting signals to mobile station 110 using up to three transmitter antennas 140. However, those skilled in the art will appreciate that each base station in a coordinated multi-point transmission network need not use all available antennas for a given transmission, and that some base stations may have more or less available antennas than others. In the pictured system, therefore, from three to nine antennas 140 may be used for a given transmission, assuming that all three of the pictured base stations 120 participate.

Because the antennas 140 at any given transmitter site 120 are close to one another, the path losses between mobile station 110 and the antennas at a given base station 120 are effectively the same. However, the path losses between mobile station 110 and each of the different base stations 120 may vary widely. As a first example, assume that the path losses between mobile station 110 and each of base stations 120-A and 120-B are roughly equal, but that the path loss between mobile station 110 and base station 120-C is higher, e.g., 10 dB greater. If mobile station 110 is served only by base stations 120-A and 120-B, and only one antenna 140 is used per base station, then each codebook entry is a two-element vector (one element for each transmit antenna 140), and the particular precoding vector to be used at a given time is selected from a codebook that is optimized for a scenario in which the path losses are almost equal. If mobile station 110 is instead served only by base stations 120-B and 120-C, then the optimal precoding vector for a given set of instantaneous channel conditions is selected from a codebook optimized for a path loss scenario where one path loss is approximately 10 dB greater than the other.

As another example, if all three antennas 140 at each of the base stations 120 are used, then each codebook entry (precoding vector) will include nine elements. In this case, three sites are used, so the grouping of the allowed precoding vectors into codebooks is based on a three-part combination of path losses from the mobile station 110 to the base stations.

Thus, a pre-determined set of precoding vectors may be divided into a plurality of pre-determined subsets, with each subset (codebook) corresponding to one or more path loss scenarios. The pre-determined set of precoding vectors and the pre-determined subsets may be specified in a particular standard, so that it is known to the network and to mobile stations operating in the network.

Those skilled in the art will appreciate that the number of possible combinations of path losses can be very large. However, ranges of path loss scenarios can be mapped to codebooks that are optimal or near-optimal for at least a part of that range. In this way, the number of different codebooks can be kept at a manageable level.

Thus, in various embodiments of the invention, a number of codebooks are defined, where each codebook includes several precoding vectors. In other words, a pre-determined set of precoding vectors may be divided into a plurality of pre-determined subsets, with each subset (codebook) corresponding to one or more path loss scenarios. Given Q codebooks, L(q) may be used to indicate the number of precoding vectors in the q-th codebook, which is designated B(q). Furthermore, a particular precoding vector may be readily identified by a combination of two indices: a group index, specifying one of the Q codebooks, and a vector index, specifying one of the L(q) precoding vectors in the codebook identified by the group index. A particular pre-determined set of pre-coding vectors and the pre-determined subsets may be specified in a particular standard, so that it is known to the network and to mobile stations operating in the network. With this shared knowledge, a mobile station and the network can communicate about the precoding vectors using only the group and vector indices.

As noted above, because the antennas at a given transmitter site are located very close to one another, as compared to the distance to a given mobile station, the path loss (including shadowing) from all of the antennas at a given site to the given mobile station will be almost the same. The path loss corresponding to a given transmitter site may be denoted by G(s). Then, the path losses from all the M transmit antennas to the mobile station are specified by a vector G (of length S) defined as:

$$G=[G(1), G(2), \ldots, G(s)] \tag{1}$$

Periodically, a network configured according to some embodiments of the present invention forms an estimate of G, denoted by Estimated_G, based on uplink measurements or based on reports from the UE, for each mobile station. Note that this estimate process includes (or presupposes) choosing the specific S sites that will be serving a given mobile station on the downlink. This selection, as well as the estimation of the path losses, may be performed on a relatively infrequent basis, e.g., at time intervals many times the expected fast-fading time. Thus, the estimation process may comprise the averaging of several uplink measurements or channel reports from the mobile station, so that fading effects are averaged out.

There will be a mapping from the estimated values of G to the best codebook for the mobile station. This mapping may be denoted as Mapping(G); the output of Mapping(G) is one of the Q codebooks defined previously (or an index to one of the Q codebooks defined previously).

Once the network determines the best codebook for a given mobile station, the network signals to the mobile station, e.g., on a downlink control channel, its selection of the best codebook for this mobile station. Because the mobile station already "knows" the contents of each of the pre-determined codebooks, only the index of the chosen codebook needs to be signaled; the elements of each of the vectors in the codebook need not be signaled. Those skilled in the art will appreciate that the network must also signal to the mobile station the sites from which the mobile station will be receiving its transmission; this signaling may be sent in a single message, along with the codebook index, or in a separate message.

After receiving an indication of the chosen codebook from the network, as well as the set of transmitter sites that will be serving it, the mobile station then reports to the network a vector index associated with its choice of precoding vector within the chosen codebook. This vector index is selected by the mobile station based on evaluating "instantaneous" (short-term) channel conditions between the M transmit antennas and the mobile station. These channel conditions change quickly; thus, the channel conditions are re-evaluated and the selection of the vector index is updated on a frequent basis (i.e., at several or many times the rate at which the codebook is updated).

Next, the network will use the vector index reported by the mobile station, as well as the network's knowledge of the codebook it assigned to the mobile station, to identify the particular precoding vector that should be used for transmitting to the mobile station on the downlink from the S sites that the network has chosen for serving this mobile station, given the previously identified codebook.

If dedicated reference signals are used for transmitting to the mobile stations, the network will not need to signal to the UE which precoder is actually used for each transmission to the mobile station. However, some networks may be configured so that the network is permitted to select a pre-coding vector other than the one selected and identified by the mobile station. In this case, if no dedicated reference signal is used, then the network must signal to the mobile station which precoding vector (within the codebook that was previously chosen for the mobile station) was used for each transmission to the mobile station, so that the mobile station can properly decode the common reference signals (which are not weighted by UE-specific precoding weights).

Figure 2:
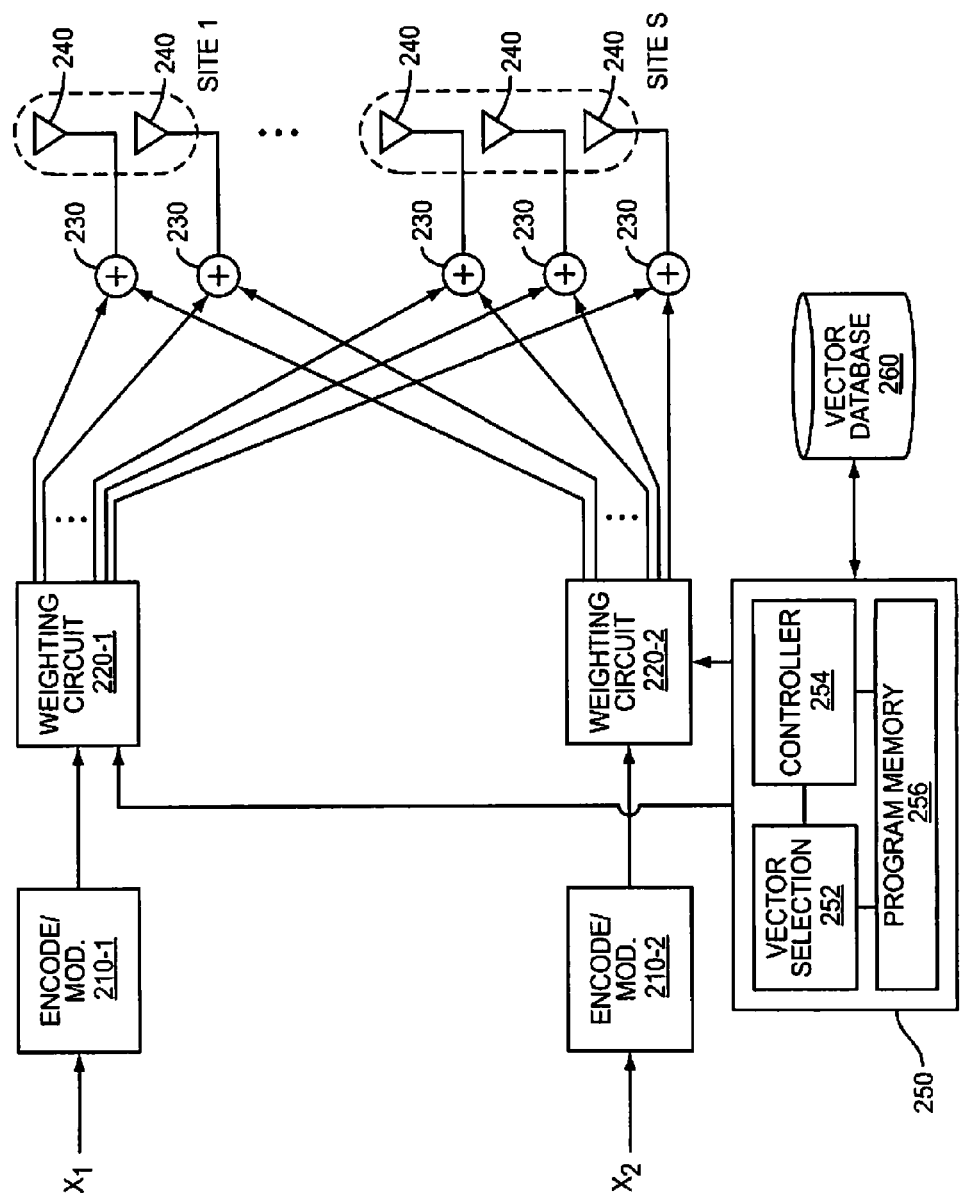
FIG. 2 is a schematic diagram illustrating additional details of a multi-point transmission system according to some embodiments of the present invention.

FIG. 2 is a schematic diagram illustrating functional components of the fixed network portion of a wireless communication system, according to some embodiments of the invention. In the pictured arrangement, two data streams (designated $X_1$ and $X_2$) are targeted to a particular mobile station (not shown). Each data stream is separately encoded and modulated, using encoding/modulation circuits 210-1 and 210-2. Vector weights, supplied by processing circuits 250, are applied to each of the modulated data streams at weighting circuits 220-1 and 220-2. As described in further detail below, the vector weights are precoding vectors selected and identified according to the inventive techniques described herein. The output of the weighting circuits 220, i.e., the weighted transmitter symbols are applied to the antennas 240 at each of S sites. In the illustrated system, two data streams are spatially multiplexed, thus each antenna is provided weighted signals corresponding to streams $X_1$ and $X_2$; these signals are summed for each antenna using adders 230. Of course, in other systems, or at other times (e.g., depending on channel conditions) only a single stream (or more than two streams) might be used.

The precoding vectors applied to the modulated data streams at weighting circuits 220-1 and 220-2 are provided by processing circuits 250, which comprise a vector selection circuit 252 and a controller circuit 254, which comprise one or more microprocessors, microcontrollers, or the like, configured with appropriate program code stored in program memory 256. The processing circuits 250 have access to a vector database 260, which may stored in one or more memory devices, including, in some embodiments, the same memory device (or devices) used for program memory 256. Those skilled in the art will readily appreciate that, in some embodiments, vector selection circuit 252 and controller circuit 254 may be implemented using a single, shared, microprocessor, while in other embodiments the functions performed by the illustrated circuits may be spread among two or more circuits, in one or more nodes of the wireless communication system. Those skilled in the art will further appreciate that the advantages and disadvantages of centralizing or distributing the functionality of vector selection circuit 252 and controller circuit 254 will vary, depending on the underlying architecture of the wireless communication system.

Figure 3:
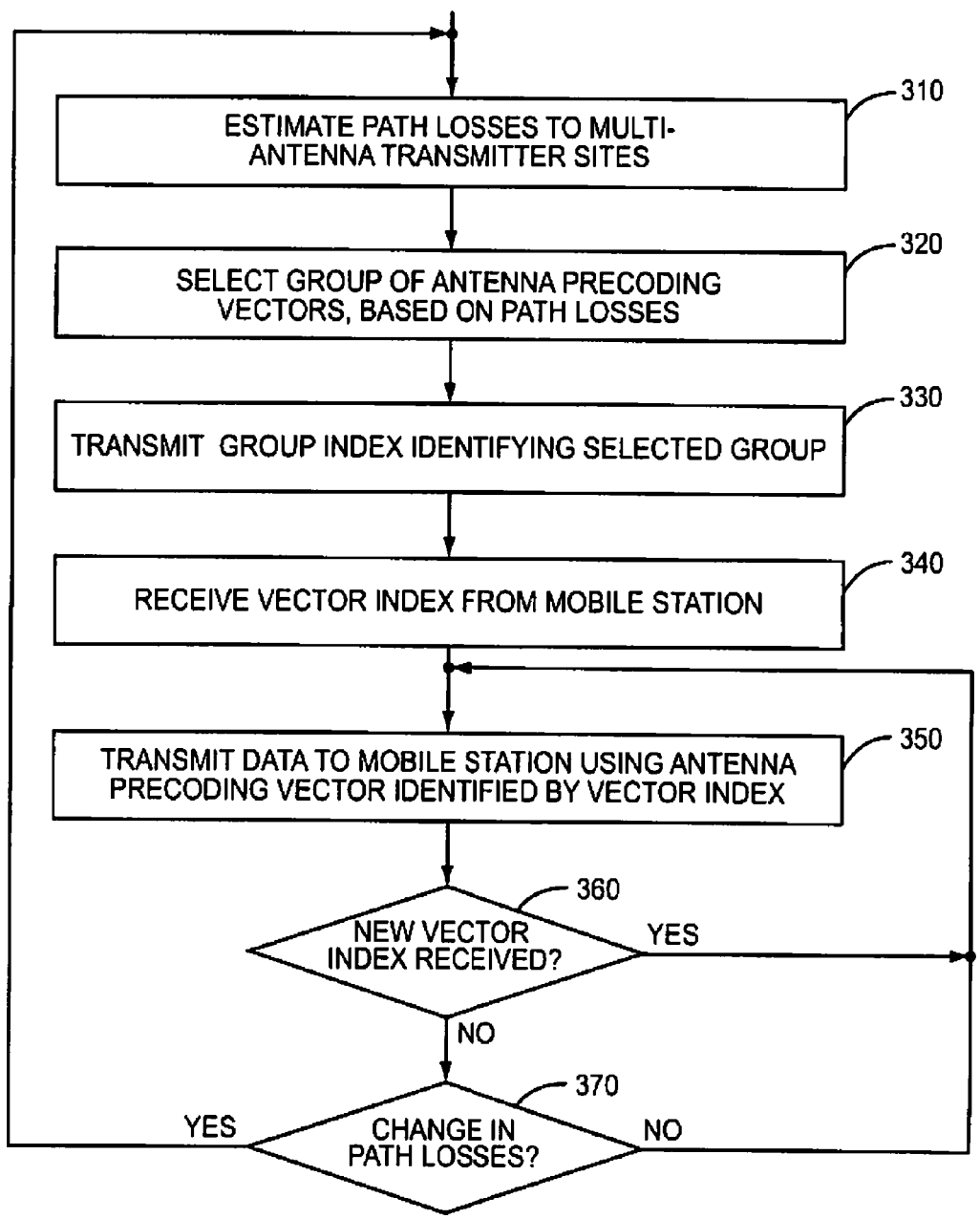
FIG. 3 is a process flow diagram illustrating an exemplary method for determining transmission parameters in a mobile communications network using coordinated transmissions from multiple transmitter sites.

FIG. 3 illustrates an exemplary method for determining downlink transmission parameters in a mobile communication network employing multi-point transmissions. The method illustrated in FIG. 3, and variations thereof, may be implemented with the processing circuits 250 of FIG. 2, or similar circuit arrangements.

In any case, the method illustrated in FIG. 3 begins with the estimation of path losses between a mobile station and each of a plurality of transmitter sites, as shown at block 310. In some embodiments, the path losses are estimated at each of several base stations that are currently transmitting signals to the mobile station or that are expected to transmit signals to the mobile station in the future; in others, one of the base stations (e.g., an "anchor" base station) or another centralized node in the network estimates the path losses based on data reported to it from the various base stations. In some embodiments, the path losses are estimated based on channel quality data characterizing downlink signal quality or downlink path loss (e.g., signal strength, signal-to-noise ratios, or the like) and sent to the network by the mobile station; this data may be sent to each of several base stations or to a single base station. In still other embodiments, the estimation of path losses may comprise first estimating uplink path losses, based on measurements of uplink signals from the mobile station, and then estimating corresponding downlink path losses based on the estimated uplink path losses.

The path losses reflect the configuration of the base stations and the mobile station in a macro sense, in that the path losses reflect propagation loss as a function of the distance between each base station and the mobile, as well as shadowing caused by physical features of the environment (hills, valleys, buildings, etc.). These path losses, which do not include fading effects resulting from phase-sensitive combinations of multipath signals, change relatively slowly. Thus, in some embodiments, the path loss estimates are based on averages of several measurements, taken over a period of time that exceeds the expected fading intervals.

Given the estimated path losses, a best one of a plurality of codebooks (i.e., a subset of a pre-determined set of antenna precoding vectors, each subset including a plurality of antenna precoding vectors) is selected. As discussed above, each of the plurality of codebooks corresponds to a particular combination of path loss conditions, given a particular number of transmitting sites and antennas. Thus, the codebook corresponding to path loss conditions that best match the estimated path losses is selected, as shown at block 320. Because the mobile station is programmed with knowledge of the predetermined codebooks, the selected codebook can be identified to the mobile station by simply transmitting a group index to the mobile station, as shown at block 330, with the group index uniquely identifying the selected codebook.

As discussed above, the number of bits needed to specify the group index depends on the number of codebooks, Q. If there are 32 codebooks, for example, then five bits ($\log_2 32$) are needed to specify the group index. The group index is transmitted relatively infrequently, however, as the path loss conditions are generally expected to change slowly; thus, even larger numbers of codebooks are feasible.

Given a selected codebook, the mobile station estimates channel conditions between the base stations and the mobile, including fading effects, and selects a best antenna precoding vector from the selected codebook. The mobile station can then identify the selected antenna precoding vector to the network using a vector index that corresponds to the selected precoding vector within the selected codebook. Because the vector index only needs to identify a particular vector within an already determined codebook, the vector index can be relatively short, depending only on the maximum number of precoding vectors in any given codebook. Thus, for example, four bits ($\log_2 16$) are sufficient to identify a particular vector in any given codebook if no codebook includes more than sixteen vectors.

The vector index is received from the mobile station, as shown at block 340, and is used to retrieve the identified precoding vector from the previously identified codebook. One or more data streams are then weighted, using the selected precoding vector, and transmitted to the mobile station, as shown at block 350. Of course, some systems may be configured so that the vector index received from the mobile station indicates only the mobile station's preference; these systems may be configured to occasionally over-ride the indicated preference, based on the network's knowledge of channel conditions, network loading, etc. In these systems, if a precoding vector other than the one preferred by the mobile station is used, then the network may need to signal the mobile station to indicate the precoding vector that is actually used. As suggested above, this is particularly true if common reference signals (i.e., downlink reference signals for multiple mobile stations) are used, as each mobile station then needs to know that the common reference signals are weighted differently than data signals.

The "instantaneous" channel conditions at the mobile station change relatively rapidly, compared to the path losses, due to fading effects. Thus, for any given path loss scenario, the best precoding vector within a selected codebook is likely to vary from one moment to the next. Thus, in some embodiments of the invention, the mobile station is configured to repeatedly evaluate channel conditions, to update its preferred precoding vector as needed, based on the re-evaluated channel conditions, and to transmit new vector indices, as needed, to the network. At the same time, the network periodically updates its estimates of the relevant path losses, and selects a new "best" codebook as needed. These processes are illustrated in FIG. 3. As shown at block 360, for instance, the network periodically checks to see whether a new vector index has been received before transmitting a second burst of data to the mobile station. If so, a subsequent data transmission uses the newly selected vector index. The network also periodically checks to see whether the path losses have changed sufficiently to warrant the selection of a new best codebook, as shown at block 370. If so, a new codebook is selected, and a new group index identifying the selected codebook is sent to the mobile station, as shown at blocks 320 and 330.

Of course, because the expected rates of change for the group index and the specific vector index differ, the rate at which these updates are performed will also vary. In fact, vector index changes are likely to occur many times more often than group index changes, under many network configurations and scenarios. Thus, the signaling described above is likely to be dominated by the vector index signaling. Because the number of bits needed to signal the vector index is relatively small (e.g., 4 bits, compared to the 9 bits that would be needed to uniquely identify one of 16×32 ungrouped precoding vectors), the signaling overhead is reduced.

Figure 4:
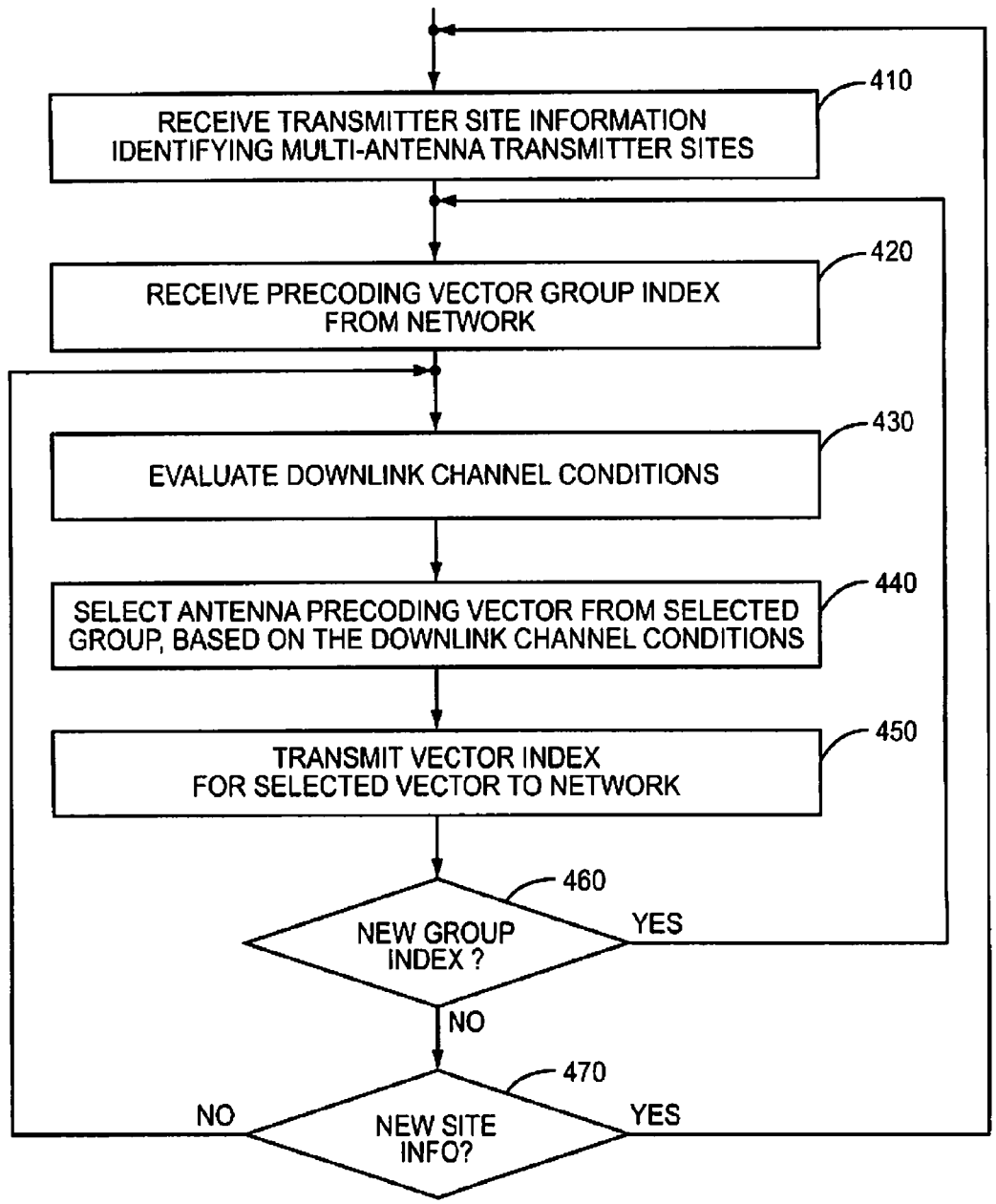
FIG. 4 is a process flow diagram illustrating an exemplary method in a mobile station for determining transmission parameters for use in coordinated multi-point transmissions.

While FIG. 3 illustrated an exemplary process for selecting and identifying antenna precoding vectors at the network. FIG. 4 illustrates a corresponding process that can be implemented in a mobile station operating in a mobile communications network using coordinated transmissions from multiple transmitter sites. As shown at block 410, the illustrated method begins with the receipt of transmitter site information identifying two or more transmitter sites; one or several of these transmitter sites may have two or more antennas for downlink transmission. This information identifies the downlink signals that the mobile station will evaluate to select preferred antenna precoding vectors for downlink transmissions.

As shown at block 420, the mobile station receives a group index from the network, the group index identifying a selected one of a plurality of pre-determined subsets (i.e., codebooks) of a pre-determined set of precoding vectors. As discussed earlier, the network and the mobile station share knowledge of the subsets of precoding vectors; these subsets may be specified in an industry standard, in some embodiments, specific to a particular network in others, or even developed in an ad hoc fashion in still others. Of course, in the latter cases, a mechanism for providing the mobile station with shared knowledge of the codebook groupings is needed, such as pre-programming and/or broadcast signaling.

As shown at block 430, the mobile station evaluates the downlink channel conditions between the mobile station and each of the identified transmitter sites. These evaluations are performed over a short time interval, so that the evaluations capture the short term channel conditions, rather than the longer-term, more stable, path loss conditions. Based on the evaluated channel conditions, a preferred antenna precoding vector is chosen from the codebook identified by the group index, as shown at block 440. A vector index identifying the chose precoding vector, given the selected group, is then transmitted to the network, as shown at block 450. As discussed above, this vector index can be much shorter than would be needed to uniquely identify a precoding vector out of an ungrouped set of all available precoding vectors.

As with the network-based method illustrated in FIG. 3, the selection of a preferred vector index may be updated periodically. In addition, a new group index may be signaled to the mobile station from time to time. Thus, as shown at blocks 460 and 470, the mobile station periodically checks whether a new group index has been received, specifying a new codebook, or whether new site info has been received, specifying a new set of transmitter sites. In any case, the short-term channel conditions are periodically re-evaluated, and a new preferred precoding vector chosen, as needed.

Those skilled in the art will appreciate that variations of the above-described techniques are possible. For instance, the process flow diagrams of FIGS. 3 and 4 illustrate a process in which the best codebook to use at any given time is selected at one or more nodes on the fixed side of the communications network. In other embodiments of the invention, the codebook is instead selected at the mobile station. Thus, for example, the "receiving" step illustrated at block 420, in which a group index is determined by a mobile station by simply receiving it from the network, may be replaced, in some embodiments, with a step in which a group index identifying a particular subset of pre-coding vectors is determined at the mobile station itself. In some of these embodiments, the mobile station determines the group index by estimating path losses between the mobile station and each of several base stations, selecting one of a plurality of pre-defined codebooks based on the estimated path losses, and identifying the group index that corresponds to the selected codebook. In these embodiments, the mobile station may be further configured to transmit the group index to the mobile communications network.

Figure 5:
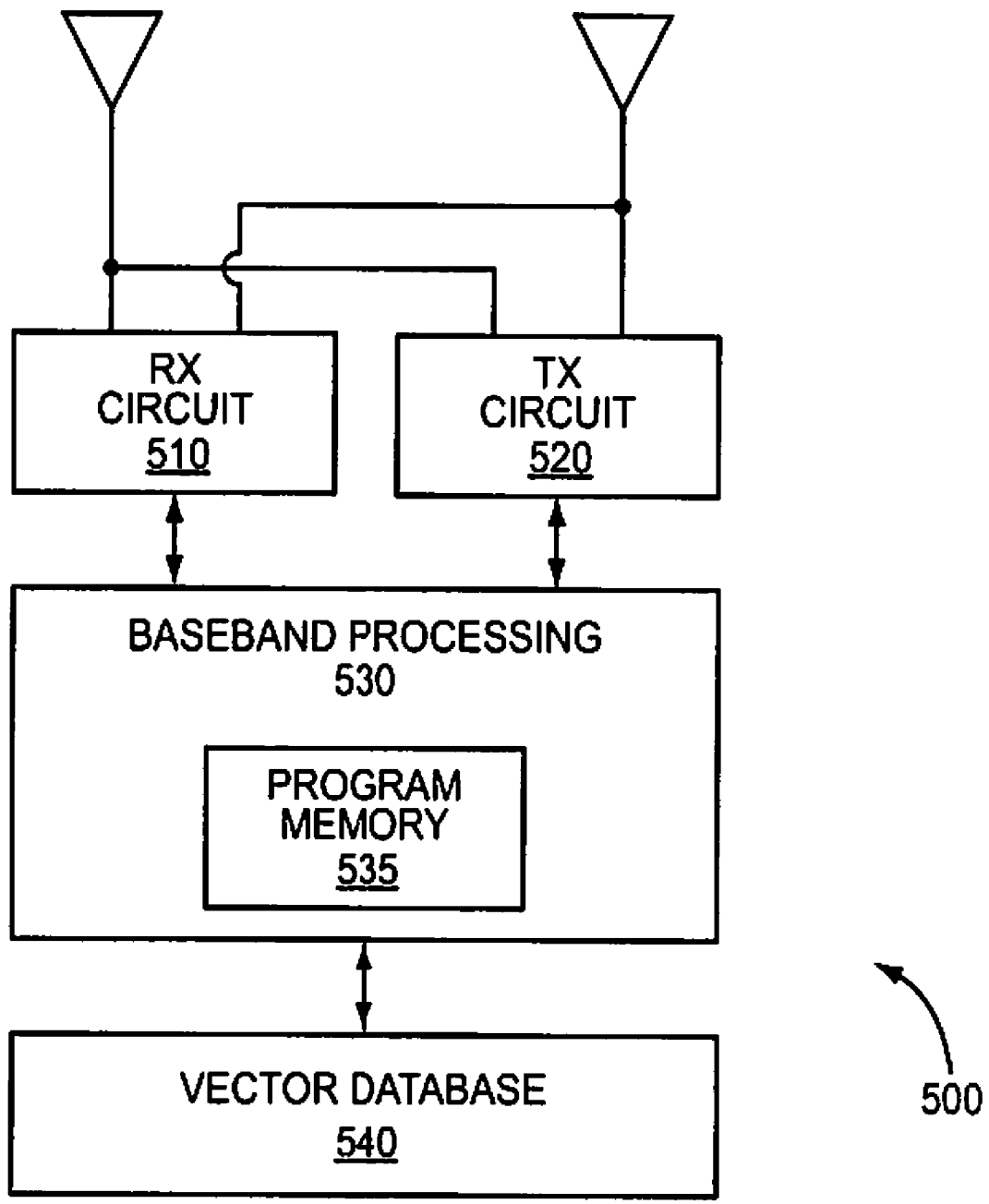
FIG. 5 is a schematic diagram illustrating features of an exemplary mobile station.

Those skilled in the art will further appreciate that the above-described mobile station-based methods may be readily adapted to mobile stations of various types and having various system architectures. An example of such a mobile station 500 is illustrated in FIG. 5, and includes a receiver front-end circuit 510, a transmitter circuit 520, and baseband processing circuitry 530. In the pictured embodiment, baseband processing circuitry 530 includes one or more microprocessors, microcontrollers, digital signal processors, and the like, each or any of which may be configured with appropriate software, including program instructions for carrying out one or more of the techniques discussed above, stored in program memory 535. Mobile station 500 further includes a vector database 540, which includes all of the available precoding vectors arranged in a format so that a particular vector can be identified by a group index, identifying a group of vectors, and a vector index, identifying a particular vector within a given group. Vector database 540 may be stored in any of a variety of known memory types and/or configurations, and may be stored in the same memory used for program memory 535, in some embodiments.

Of course, the illustrated mobile station 500 is provided only as an example; those skilled in the art will appreciate that various mobile station types and configurations can be adapted according to the techniques described herein. Likewise, the inventive techniques described herein can be applied to mobile communications networks operating according to any of a variety of mobile communications standards, including, but not limited to, LTE and W-CDMA standards promulgated by the 3GPP. Indeed, these techniques may be adapted to communications systems that have not been developed. Thus, those skilled in the art will appreciate that the present invention may be carried out in other ways than those specifically set forth herein without departing from essential characteristics of the invention, and the present embodiments are therefore to be considered in all respects as illustrative and not restrictive. All changes to the specifically described embodiments that come within the meaning and equivalency range of the appended claims are intended to be embraced therein.

What is claimed is:

1. An arrangement of processing circuits in one or more fixed nodes of a mobile communications network using coordinated transmissions from multiple transmitter sites, the arrangement of processing circuits comprising:
   one or more memory circuits storing a set of antenna precoding vectors, wherein each antenna precoding vector is indexed by a group index and by a vector index;
   one or more precoding selector circuits configured to estimate path loss between a mobile station and each of a plurality of geographically separated transmitter sites, each transmitter site having at least one transmitter antenna; and to select one of a plurality of pre-determined subsets of the set of antenna precoding vectors, based on the estimated path losses; and
   one or more controller circuits configured to transmit a first group index to the mobile station via one or more of the geographically separated transmitter sites, the first group index identifying the selected subset of antenna precoding vectors; to receive a first vector index from the mobile station, the first vector index corresponding to a first antenna precoding vector in the selected subset; and to transmit first data to the mobile station, using the first antenna precoding vector applied to the transmitter antennas at the plurality of geographically separated transmitter sites.

2. The arrangement of processing circuits of claim 1, wherein the one or more precoding selector circuits are configured to estimate path loss between a mobile station and each of the plurality of geographically separated transmitter sites by receiving channel state reports from the mobile station and estimating the path losses based on the channel state reports, wherein the channel state reports characterize downlink path loss, received downlink signal quality, or both.

3. The arrangement of processing circuits of claim 1, wherein the one or more precoding selector circuits are configured to estimate path loss between a mobile station and each of the plurality of geographically separated transmitter sites by estimating uplink path losses, based on measurements of uplink signals from the mobile station, and estimating corresponding downlink path losses based on the estimated uplink path losses.

4. The arrangement of processing circuits of claim 1, wherein the one or more controller circuits are configured to transmit site information to the mobile station prior to receiving the first vector index from the mobile station, wherein the site information identifies the plurality of geographically separated transmitter sites.

5. The arrangement of processing circuits of claim 1, wherein the one or more controller circuits are configured to:
   receive a second vector index from the mobile station, the second vector index corresponding to a second antenna precoding vector in the selected subset; and
   transmit second data to the mobile station, using the second antenna precoding vector applied to the transmitter antennas at the plurality of geographically separated transmitter sites.

6. A method for determining transmission parameters in a mobile communications network using coordinated transmissions from multiple transmitter sites, the method comprising:
   estimating path loss between a mobile station and each of a plurality of geographically separated transmitter sites, each transmitter site having at least one transmitter antenna;
   selecting one of a plurality of pre-determined subsets of a pre-determined set of antenna precoding vectors, based on the estimated path losses;
   transmitting a group index to the mobile station, the group index identifying the selected subset of antenna precoding vectors;
   subsequently receiving a first vector index from the mobile station, the first vector index corresponding to a first antenna precoding vector in the selected subset; and
   transmitting first data to the mobile station, using the first antenna precoding vector applied to the transmitter antennas at the plurality of transmitter sites.

7. The method of claim 6, wherein estimating path loss between a mobile station and each of the plurality of geographically separated transmitter sites comprises receiving channel state reports from the mobile station and estimating the path losses based on the channel state reports, wherein the channel state reports characterize downlink path loss, received downlink signal quality, or both.

8. The method of claim 6, wherein estimating path loss between a mobile station and each of the plurality of geographically separated transmitter sites comprises estimating uplink path losses, based on measurements of uplink signals from the mobile station, and estimating corresponding downlink path losses based on the estimated uplink path losses.

9. The method of claim 6, further comprising transmitting site information to the mobile station prior to receiving the first vector index from the mobile station, wherein the site information identifies the plurality of geographically separated transmitter sites.

10. The method of claim 6, further comprising:
receiving a second vector index from the mobile station, the second vector index corresponding to a second antenna precoding vector in the selected subset; and
transmitting second data to the mobile station, using the second antenna precoding vector applied to the transmitter antennas at the plurality of geographically separated transmitter sites.

11. A method in a mobile station for determining transmission parameters in a mobile communications network using coordinated transmissions from multiple transmitter sites, the method comprising:
receiving transmitter site information identifying a plurality of geographically separated transmitter sites, each transmitter site having at least one transmitter antenna;
determining a group index, the group index identifying a selected one of a plurality of pre-determined subsets of a pre-determined set of antenna precoding vectors, wherein the determining step includes estimating path loss between the mobile station and each of the plurality of geographically separated transmitter sites, selecting one of a plurality of pre-determined subsets of a pre-determined set of antenna precoding vectors, based on the estimated path losses, and identifying the group index corresponding to the selected subset;
transmitting the group index to the mobile communications network;
evaluating channel conditions between the transmitter antennas and the mobile station;
selecting a first antenna precoding vector from the selected subset, based on the channel conditions; and
transmitting a first vector index to the mobile communications network, the first vector index identifying the first antenna precoding vector, given the selected subset.

12. The method of claim 11, further comprising processing signals subsequently received from the plurality of geographically separated transmitter sites using the first antenna precoding vector.

13. The method of claim 11, further comprising:
re-evaluating channel conditions between the transmitter antennas and the mobile station;
selecting a second antenna precoding vector from the selected subset, based on the re-evaluated channel conditions; and
transmitting a second vector index to the mobile communications network, the second vector index identifying the second antenna precoding vector, given the selected subset.

14. A mobile station for use in a mobile communications network using coordinated transmissions from multiple transmitter sites, the mobile station comprising:
one or more memory circuits storing a set of antenna precoding vectors, wherein each antenna precoding vector is indexed by a group index and by a vector index;
a receiver circuit configured to receive transmitter site information identifying a plurality of geographically separated transmitter sites, each transmitter site having at least one transmitter antenna;
a transmitter circuit; and
one or more baseband processing circuits configured to determine a group index identifying a selected one of a plurality of pre-determined subsets of the set of antenna precoding vectors; evaluate channel conditions between the transmitter antennas and the mobile station; select a first antenna precoding vector from the selected subset of antenna precoding vectors, based on the channel conditions; and transmit a first vector index to the mobile communications network via the transmitter circuit, the first vector index identifying the first antenna precoding vector, given the selected subset;
wherein the one or more baseband processing circuits are configured to determine the group index by:
estimating path loss between the mobile station and each of the plurality of geographically separated transmitter sites;
selecting one of a plurality of pre-determined subsets of a pre-determined set of antenna precoding vectors, based on the estimated path losses; and
identifying the group index corresponding to the selected subset.

15. The mobile station of claim 14, wherein the one or more baseband processing circuits are further configured to transmit the group index to the mobile communications network, via the transmitter circuit.

16. The mobile station of claim 14, wherein the receiver circuit is configured to use the first antenna precoding vector to process signals subsequently received from the plurality of geographically separated transmitter sites.

17. The mobile station of claim 14, wherein the one or more baseband processing circuits are further configured to:
re-evaluate channel conditions between the transmitter antennas and the mobile station;
select a second antenna precoding vector from the selected subset, based on the re-evaluated channel conditions; and
transmit a second vector index to the mobile communications network via the transmitter circuit, the second vector index identifying the second antenna precoding vector, given the selected subset.

* * * * *